United States Patent
Ni

(10) Patent No.: US 10,051,547 B2
(45) Date of Patent: Aug. 14, 2018

(54) METHOD FOR MAINTAINING SIGNAL-TO-NOISE RATIO AT A USER TERMINAL IN A SATELLITE SYSTEM

(71) Applicant: WorldVu Satellites Limited, St Helier, Jersey, Channel Is (GB)

(72) Inventor: Melvin S. Ni, Cupertino, CA (US)

(73) Assignee: WORLDVU SATELLITES LIMITED, St Helier, Jersey (GB)

( * ) Notice: Subject to any disclaimer, the term of this patent is extended or adjusted under 35 U.S.C. 154(b) by 124 days.

(21) Appl. No.: 15/294,160

(22) Filed: Oct. 14, 2016

(65) Prior Publication Data
US 2017/0111845 A1  Apr. 20, 2017

Related U.S. Application Data

(60) Provisional application No. 62/241,449, filed on Oct. 14, 2015.

(51) Int. Cl.
| | |
|---|---|
| H04W 40/22 | (2009.01) |
| H04L 5/00 | (2006.01) |
| H04W 16/28 | (2009.01) |
| H04W 36/16 | (2009.01) |
| H04B 7/185 | (2006.01) |

(52) U.S. Cl.
CPC ........ *H04W 40/22* (2013.01); *H04B 7/18519* (2013.01); *H04L 5/006* (2013.01); *H04W 16/28* (2013.01); *H04W 36/165* (2013.01)

(58) Field of Classification Search
CPC ...................................................... H04J 12/56
USPC ........................................................ 370/316
See application file for complete search history.

(56) References Cited

U.S. PATENT DOCUMENTS

| | | | | |
|---|---|---|---|---|
| 2008/0297360 A1* | 12/2008 | Knox | ..................... | G01N 21/49 340/628 |
| 2014/0022120 A1 | 1/2014 | Mendelsohn et al. | | |

FOREIGN PATENT DOCUMENTS

| | | |
|---|---|---|
| EP | 0762254 A2 | 3/1997 |
| GB | 2438505 A | 11/2007 |

OTHER PUBLICATIONS

Officer: Arroyo Valles, "International Search Report and Written Opinion", dated Jan. 18, 2017 in counterpart PCT Application PCT/IB2016/056188.

* cited by examiner

*Primary Examiner* — Dang Ton
(74) *Attorney, Agent, or Firm* — Kaplan Breyer Schwarz, LLP

(57) ABSTRACT

A system and method for maintaining signal-to-noise ratio when a user terminal switches beams includes a user terminal that generates beam-pointing information. The beam-pointing information is used either to alter the time at which the user terminal switches communications from a first beam to a second beam transmitted from a satellite or to adjust the attitude of the satellite, thereby correcting any error in pointing angle of the beams transmitted from the satellite to the user terminal.

15 Claims, 12 Drawing Sheets

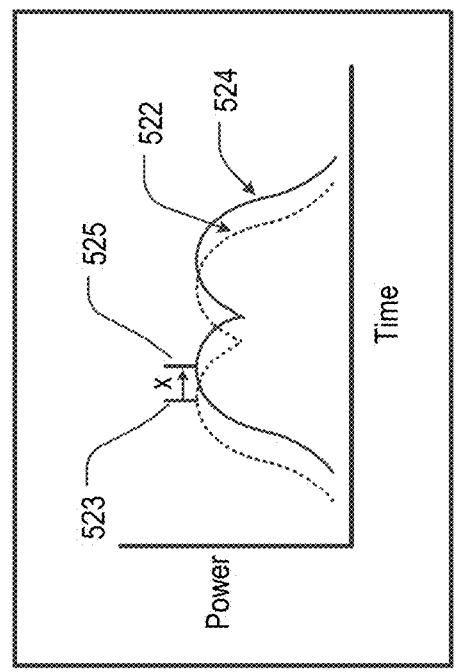
FIG. 5B
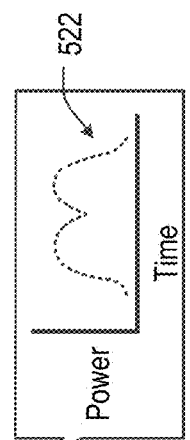
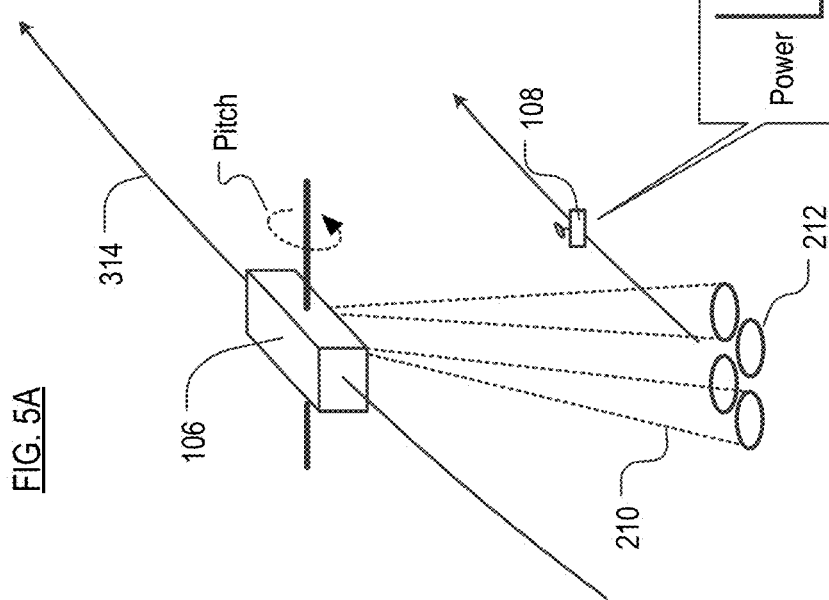
FIG. 5A

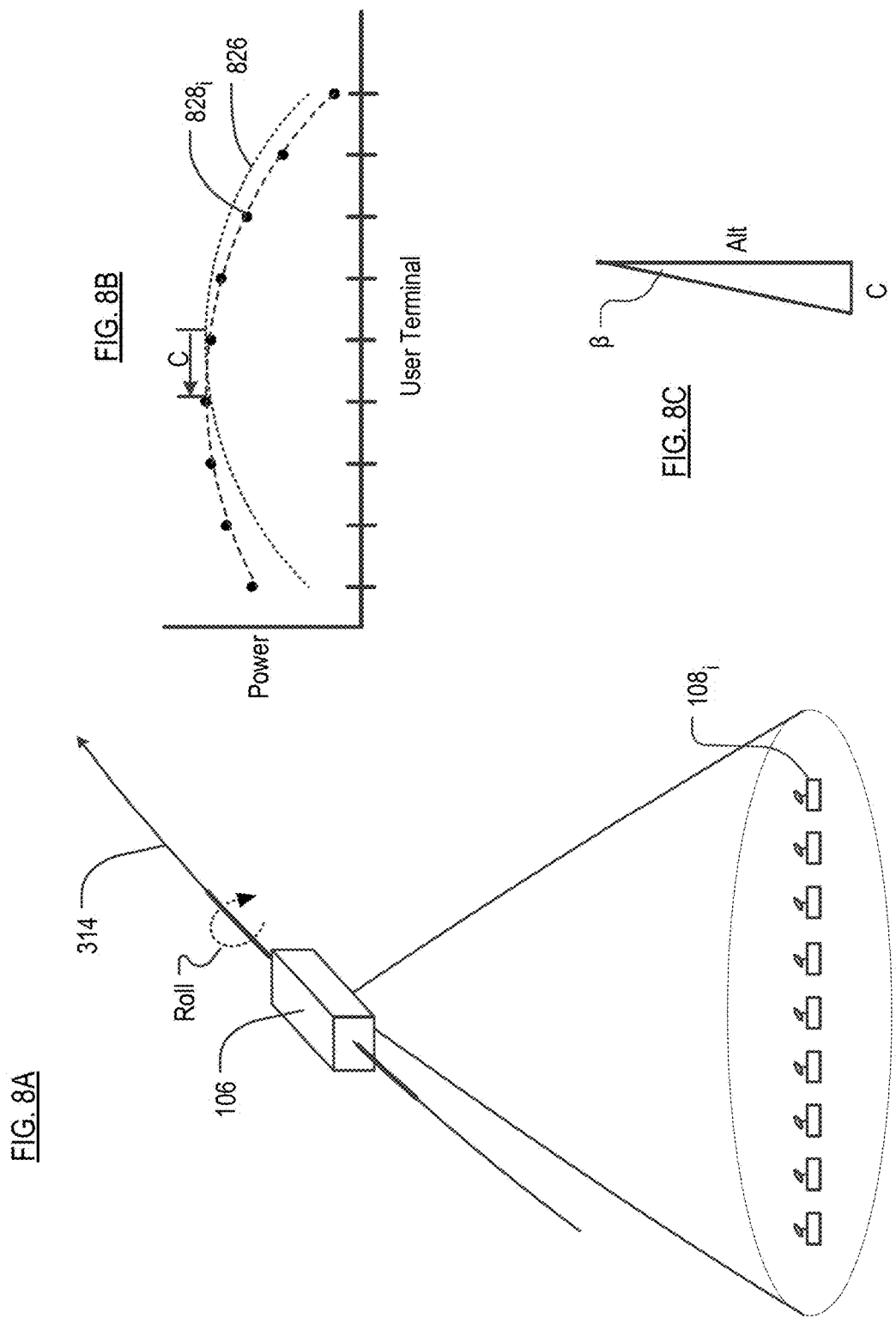

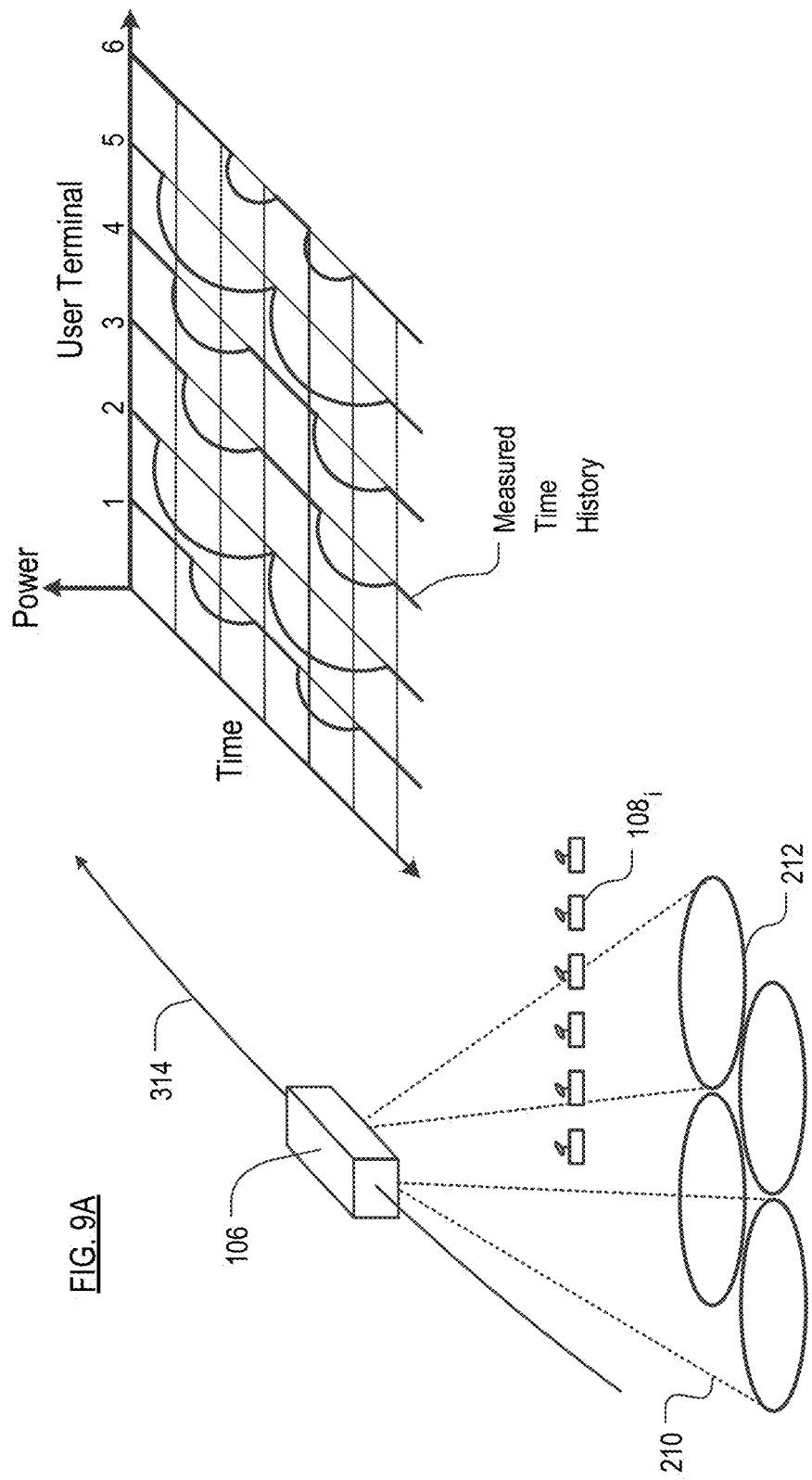

METHOD FOR MAINTAINING SIGNAL-TO-NOISE RATIO AT A USER TERMINAL IN A SATELLITE SYSTEM

STATEMENT OF RELATED CASES

This case claims priority of U.S. Patent Application Ser. No. 62/241,449 filed Oct. 14, 2015 and which is incorporated herein by reference.

FIELD OF THE INVENTION

The present invention relates to earth-orbiting communication satellites and user terminals for use therewith.

BACKGROUND OF THE INVENTION

A non-geostationary satellite system comprises a group or constellation of satellites that orbit the earth at altitudes other than geostationary orbit (c.a. 36,000 kilometers above the earth's surface). The non-geostationary satellite systems that are in low earth orbit (LEO) have less propagation loss and less propagation delay than geosynchronous satellite systems due to the lower orbit of the non-geostationary satellites. As a consequence, such satellites are better suited than geostationary satellites for interactive communications, such as internet services.

Geostationary satellite systems have an orbital period equal to the rotation period of the Earth and therefor appear, from Earth, to be at a fixed position in the sky. Non-geostationary satellites move at relatively higher speeds and therefore appear to an earthbound observer to pass overhead from horizon to horizon. Because of this relative movement between non-geostationary satellites and the Earth, such satellites move in and out of range of earth-bound user terminals. Such terminals must therefore switch their communications link from one satellite to the next (i.e., hand-off) to achieve continuous communications.

In some systems, radio transmissions from the satellite to the user terminal are in the form of multiple independent beams aimed in different directions. So, in addition to earth-bound user terminals contending with the hand-off between satellites, there is a hand-off between individual beams of an individual satellite, as the coverage area of a satellite moves past a particular user terminal.

In an optimal situation, each satellite is properly oriented in space such that the beams emanating therefrom are "pointing" in a specified direction. The reality, however, is that there can be an error in the satellite's attitude, in addition to any other errors pertaining to individual beams, such that the beams are not pointing exactly in accordance with the system design. Such inaccuracies in beam pointing lead to a reduction in the signal-to-noise ratio (SNR) at the user terminals.

Beam pointing affects SNR in two ways. One way is that if two neighboring satellites in the constellation point slightly away from each other, a gap in coverage may result on the ground between those satellites. A second way in which SNR can be affected is when a single satellite is pointing slightly the wrong way, and the dividing line between two user beams from that satellite has shifted position (e.g., ahead or behind, etc.) on the Earth's surface. This dividing line is defined as being the location where the signal strengths from both beams are equal. In systems in which the user terminal switches its telecommunications connection from one beam to the next based on time (as calculated a priori from knowledge of the ephemerides and the terminal's position), if the dividing line has shifted from its expected position, the terminal will experience unequal signal strengths before and after the shift.

Currently, there are several ways to deal with this problem. One way is to use the technique common in mobile telephony, wherein the user terminal compares the power of the signal currently being received to the power of other beams received on other channels. As soon as the received power of another beam exceeds that of the currently-received signal, the user terminal performs a switch. At that time, the received signal strength of the two beams will be very close to one another, resulting in little change in SNR. This approach, however, results in a significant amount of overhead traffic. A second way to address the problem is to design each satellite with very tight tolerances (~0.2 deg max) in beam pointing. But this necessitates relatively more expensive hardware on the satellite in addition to tight manufacturing tolerances. An inexpensive satellite control system will not be likely to meet this tolerance. A third approach is to accept that a relatively poorer quality of service will be provided to the user.

This first approach results in an excessive amount of telecommunications traffic, the second approach attempts to avoid the problem, and the third approach ignores the problem. None of these approaches is particularly satisfactory.

SUMMARY OF THE INVENTION

The present invention provides a system and method for maintaining signal-to-noise ratio as a user terminal switches communications from one beam to the next transmitted from a satellite. The invention is based on several insights:
  that rather than using the traditional approach to determining when to hand-off (i.e., comparing received power in channels), a timing-based approach can be used;
  relationships between the angular offsets and timing discrepancies can be defined;
  the information obtained from the relationships can then be:
    used to adjust the beam switchover times (so that the user terminal will receive equal signal strengths from both beams), and/or
    fed back to the satellite so that the satellite can make the necessary attitude adjustment so that no adjustment in switchover time is required.

There are many reasons why the power received at a user terminal, at a particular time, is not at the expected level. Reasons include deviations in a satellite's attitude (pitch, roll, and yaw), individual beams can be mechanically misaligned, variations in beam shape, variations in beam strength, a satellite might not be exactly at the prescribed position in its orbit, and so forth. Each of these problems will be characterized by some parameter (e.g., satellite orbital position, beam orientation angles, etc.). And each of these problems will results in a timing error.

More particularly, ideally, a user terminal switches it communications from one satellite beam to the next when the power received at the user terminal is the same for both beams. This results in a constant signal-to-noise ratio when the user terminal switches beams. That switch is performed in accordance with a schedule. Specifically, the user terminal receives a look table that indicates which satellite, and which beam of the satellite, the user terminal should communicate with at a particular time. The information in the table assumes that the beam are all pointing exactly as expected.

If they are not, as occasioned by any of the aforementioned problems, the switch-over times will be in error. Thus, rather than the received power levels remaining unchanged at switch over, there will be a change—typically a drop—in received power. This results in a decrease in signal-to-noise ratio.

In accordance with the present teachings, beam pointing information is obtained by user terminals. In particular, the user terminals obtain readings of the power received from a beam as a function of time. The system takes that data and compares it to the expected power levels. From that comparison, information can be extracted that correlates to errors in satellite attitude (i.e., roll, pitch, and yaw). In addition to determining errors in satellite-attitude, measurement data can capture other types of errors as well.

Ultimately, the beam-pointing information generated by the measurements obtained from the user terminals is used either to: (1) alter the time at which the user terminal switches communications from a first beam to a second beam or (2) adjust the attitude of the satellite (thereby correcting any error in pointing angle of the beams transmitted from the satellite to the user terminal).

BRIEF DESCRIPTION OF THE DRAWINGS

FIGS. 5A-5B depict a method for determining pitch error in accordance with an illustrative embodiment.

FIGS. 8A-8C depict a method for determining roll error in accordance with an illustrative embodiment.

FIGS. 9A-9B depict a method for determining roll, pitch and yaw errors together in accordance with an illustrative embodiment.

FIG. 11b depicts a map of beam assignment regions on the ground from the parameters used in the simulated map of FIG. 10a.

DETAILED DESCRIPTION

The illustrative embodiment of the invention pertains to satellite system 100 for bringing low-cost, broadband internet service to any location on the earth. Embodiments of the invention are generally applicable to non-geostationary satellites that generate beams of radiation (e.g., optical, RF, or anything else) measurable on the ground, with any number of satellites (i.e., one or more).

Figure 1:
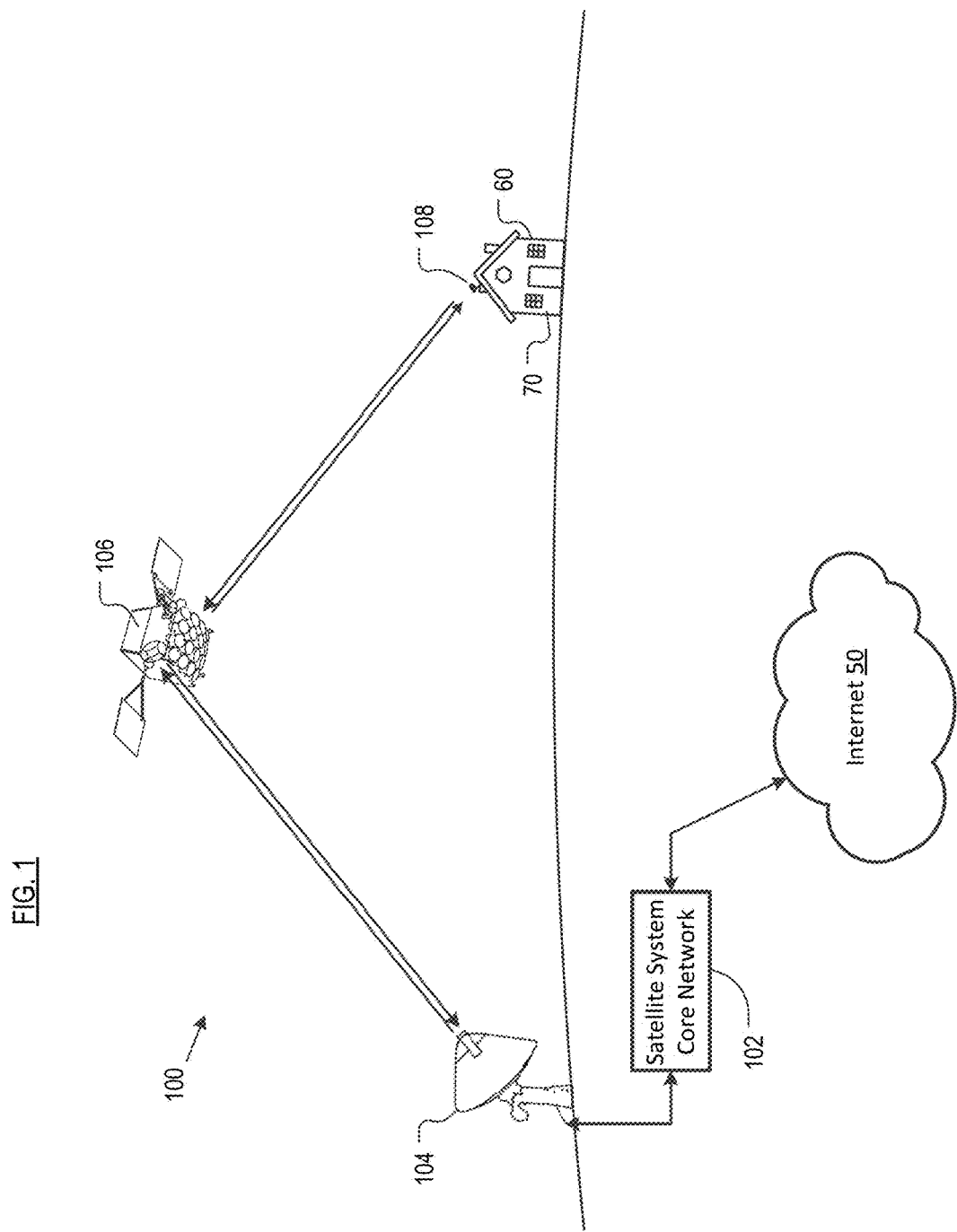
FIG. 1 depicts a satellite system 100 for delivering internet service to the home, etc.

FIG. 1 depicts an illustrative embodiment of satellite system 100 and its operating environment. System 100 includes core network 102, gateway antenna(s) 104, LEO satellite(s) 106, and user terminals 108. System 100 transmits data from Internet 50 to user device 70 (e.g., television, computer, tablet, smart phone, or other device capable of receiving and/or transmitting data) and vice versa.

Core network 102 receives/transmits data from/to Internet 50. Among other functions, core network 102 routes data packets to plural gateway antennas 104 for transmission to plurality of LEO satellites 106. Likewise, core network 102 receives data packets from the plurality of LEO satellites via the plural gateway antennas. In addition to containing Internet content, etc., the data packets contain system-related information, as discussed further below.

For simplicity, FIG. 1 depicts a single LEO satellite 106; it is to be understood, however, that system 100 includes a plurality of such LEO satellites, referred to as a "constellation." For example, in some embodiments, the constellation includes a very large number of satellites, such as 720 satellites. In some embodiments, the constellation of satellites is organized into plural orbital "planes," wherein each orbital plane is at a different altitude. There are typically, but not necessarily, an equal number of satellites in each orbital plane.

In the embodiment depicted in FIG. 1, user device 70 receives and/or transmits data, via user terminal 108, from or to satellite 106. User device 70 is depicted as being located within structure 60. In some other embodiments, user device 70 is used outdoors, as supported by appropriate extended telecommunications connectivity between user terminal 108 and the user device.

In the illustrative embodiment, user terminal 108 is depicted as being mounted on structure 60, which is a residence. In some other embodiments, structure 60 is a building other than a residence, such as a business (e.g., office building, restaurant, warehouse, etc.), a shed, or even a slow moving vessel, such as a cruise ship, etc. Typically, one user terminal 108 is sited at each location (e.g., residence, business, etc.) to provide internet connectivity thereto. An embodiment of user terminal 108 is provided in U.S. application Ser. No. 14/627,577, filed Feb. 20, 2015 and entitled "User Terminal Having A Linear Array Antenna With Electronic And Mechanical Actuation System."

Figure 2:
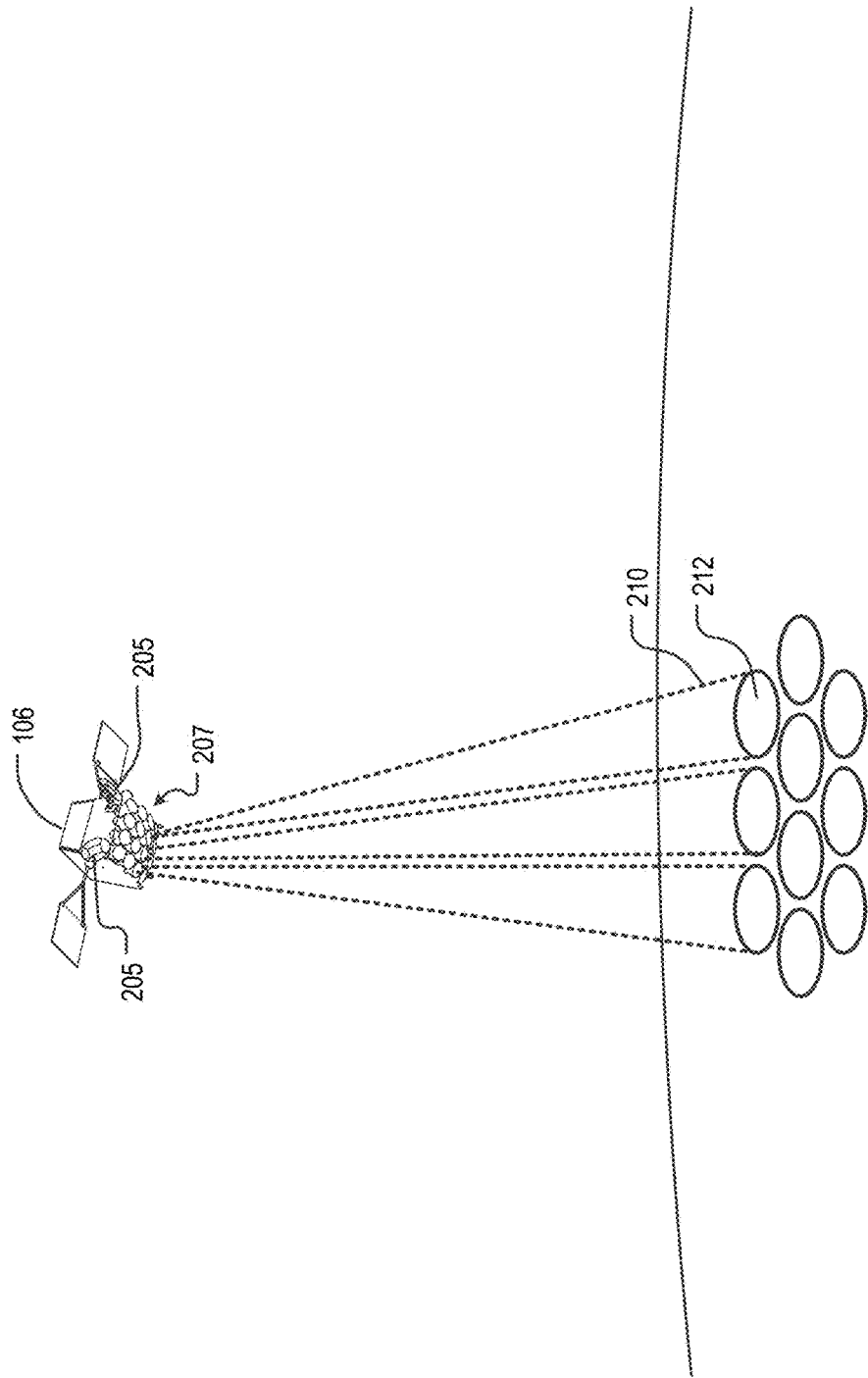
FIG. 2 depicts beams being transmitted from a satellite of system 100.

As depicted in FIG. 2, LEO satellite 106 is equipped with plural versions of at least two different types of antennas. Antennas 205 are for communications with gateway antenna(s) 104 and antennas 207 are for communications with user terminals 108. In the illustrative embodiment, antennas 207 are radio antennas for transmitting radio signals toward the surface of the Earth. Such transmissions are depicted as beams 210, each of which provides a footprint 212 on the surface of the Earth. When user terminal 108 is within footprint 212 of one of beams 210, that user terminal receives such data from that radio transmission.

Upon initial commissioning of user terminal 108, the user terminal performs a rapid scan of the sky until it acquires and tracks one of satellites 106 (i.e., by listening for a pilot signal that all satellites in the satellite constellation transmit). Once user terminal 108 has completed a sign-in and is authenticated (including forwarding its precise location to the system), it receives, via a control channel, a "satelliteand-beam" look-up table. This table indicates which particular satellite 106 and which beam 210 of the satellite user terminal 108 should communicate with at a given time. The look-up table is updated periodically as information about the ephemerides is updated (e.g., daily, etc.).

Use of the information contained in the look-up table is based on an implicit assumption; namely, that the beams transmitted from the satellites are pointing exactly where expected and transmitting at a specified amount of power. Since this assumption is not likely to be accurate most of the time, the switching time specified in the table will be in error.

Figure 3:
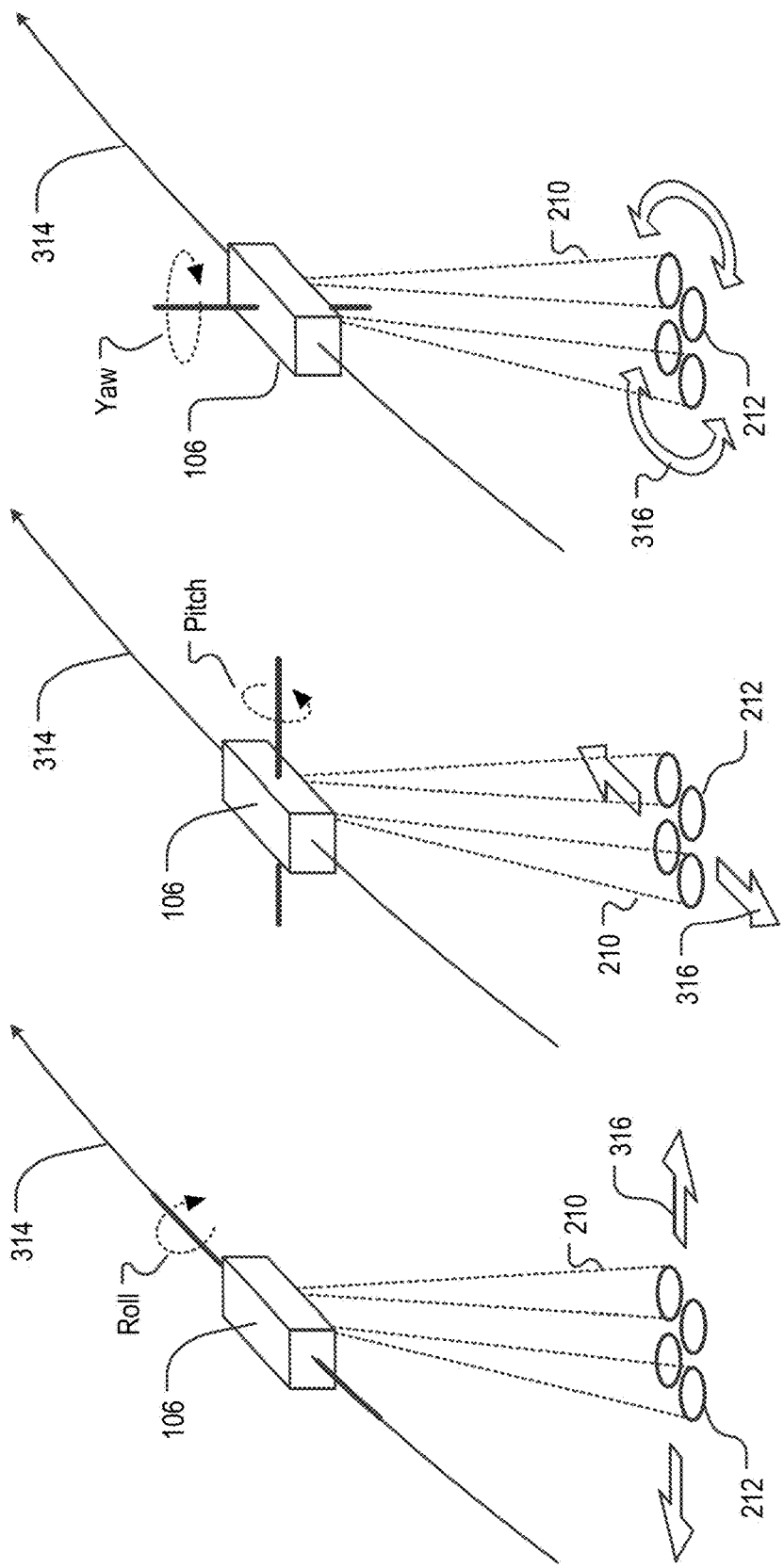
FIG. 3A depicts the impact of roll error on the beams being transmitted from a satellite.
FIG. 3B depicts the impact of pitch error on the beams being transmitted from a satellite.
FIG. 3C depicts the impact of yaw error on the beams being transmitted from a satellite.

An offset, for example, in any one or more of a satellite's roll, pitch, or yaw, will change the pointing direction of its beams. FIGS. 3A through 3C illustrate the effect on beam pointing direction for the aforementioned errors. In these figures, arrow 314 represents the direction of flight of satellite 106 in its orbit.

FIG. 3A depicts the effect of satellite roll on beam pointing direction. Although shown rolling in a clockwise direction, it will be understood that the satellite can roll in a clockwise or counterclockwise direction. "Roll" is when the rotation axis is parallel to the direction of flight. Arrows 316 depict the direction in which beams 210 (and their respective footprints 212) will shift as a consequence of roll. The shift is "left" or "right" in the figure, which is orthogonal to the satellite's direction of flight.

FIG. 3B depicts the effect of satellite pitch on beam pointing direction. Although shown pitching in a counterclockwise direction, it will be understood that the satellite can roll in a counterclockwise or clockwise direction. "Pitch" is when the rotation axis is orthogonal with respect to the direction of flight. Arrows 316 depict the direction in which beams 210 (and their respective footprints 212) will shift as a consequence of pitch. The shift is "forward" or "back" in the figure, which is parallel to the satellite's direction of flight.

FIG. 3C depicts the effect of satellite yaw on beam pointing direction. Although shown yawing in a clockwise direction, it will be understood that the satellite can roll in a clockwise or counterclockwise direction. "Yaw" is when the rotation axis is orthogonal (and out of plane) to the direction of flight. Arrows 316 depict the direction in which beams 210 (and their respective footprints 212) will shift as a consequence of pitch. The shift is "clockwise" or "counterclockwise" when viewed from above.

Figure 4:
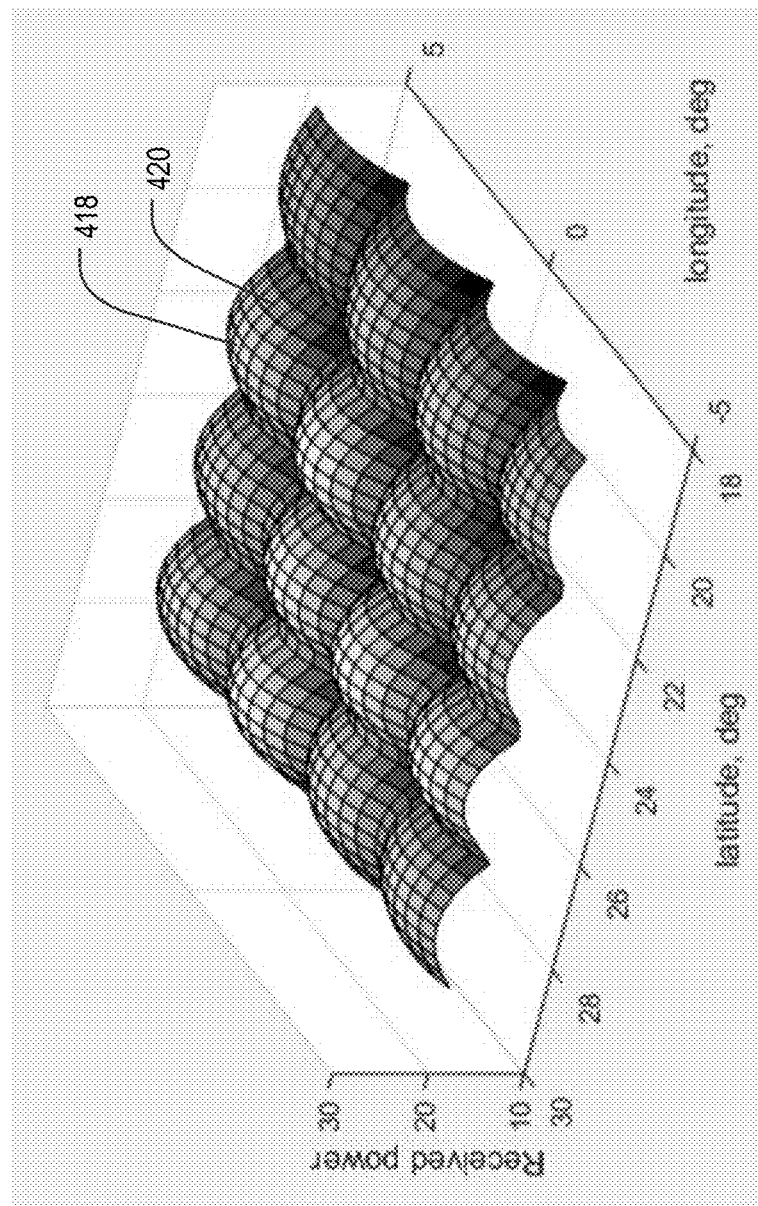
FIG. 4 depicts the power received by a user terminal as a function of position thereof in the coverage area under the satellite, for a satellite having 16 beams.

FIG. 4 depicts a computer prediction of the power received by user terminals 108 under one of satellites 106. In this figure, the satellite transmits sixteen beams. For each beam, the received power shows a characteristic 'hump' shape with peak 418. Depending on where on the ground a user terminal is relative to the satellite, that user terminal may see power at peak 418, or less power 420 when on the slopes. The "valleys" between humps are locations where the power received from neighboring beams are equal. When the power received at the user terminal coincides with such a valley is when beam switching should occur, so that the user terminal does not see any step changes in received power.

Assume that FIG. 4 depicts the power received at a plurality of user terminals when the beams are pointing in a nominal direction. The time at which any particular user terminal should switch between beams is based on when, for that particular user terminal, the received power is in a "valley." Consider what happens if the pointing direction of the beams are offset from nominal, due for example, to roll, pitch, or yaw of the satellite. The time at which the power received at a user terminal corresponds to a power level in a valley would be altered. Consequently, if user terminal 108 were to switch to a different beam at the time specified in the look-up table, it would not correspond to a power-level in a valley. The result would be a step-change (and typically a decrease) in the received power at switch-over.

The remainder of the specification discloses a way to correct for beams that are not pointing precisely where expected as consequence of satellite-attitude offsets or other problems. That is, a mathematical relationship, based on geometrical and trigonometric considerations, between any offsets and the timing discrepancy is developed and used to maintain the signal-to-noise ratio at the user terminal.

If the angular offsets are small, the timing discrepancy will also be small, and the mathematical relationship can be approximated by a linear relationship. As a result, a timing discrepancy can be expressed, approximately, as a linear function of the three angle offsets. To solve for the three unknowns—in this case, the three angular offsets, at least three equations are required. As already indicated, one estimate of a timing discrepancy can be expressed as a linear function of the three angle offsets. This provides one linear equation. Two more timing discrepancy estimates will provide the two additional equations needed to derive values for the three unknown angle offsets.

Additional timing discrepancy estimates can be used to determine an "optimal" set of solutions for the three unknowns. That is, with more equations than unknowns, the system of linear equations is commonly referred to as "overdetermined". A covariance matrix, discussed below, can then be used in conjunction with the linear equations to find an "optimal" set of solutions for the three unknown angular offsets.

FIGS. 5A and 5B depict a method for measuring pitch. A single user terminal 108 in the path of satellite 106 receives (e.g., from satellite system core network 102 of FIG. 1, etc.) profile 522 of the expected received power as a function of time. User terminal 108 measures received power. The received power values are curve fitted and compared to profile 522, as depicted in FIG. 5B. A difference X in arrival time between peak power 523 (predicted) and peak power 525 (measured) is obtained. This error quantity in time is a measure of pitch error, as discussed further below.

Figure 6B:
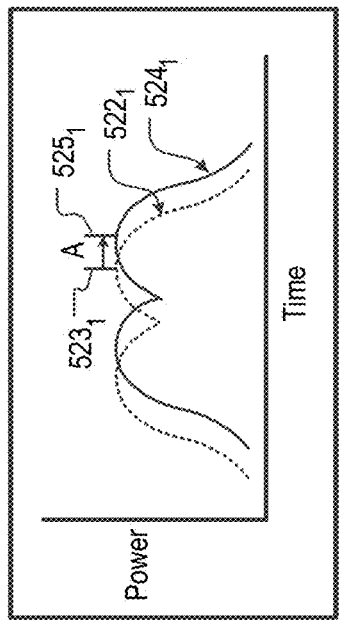
FIGS. 6A-6C depict a method for determining yaw and pitch errors in accordance with an illustrative embodiment.
Figure 6C:
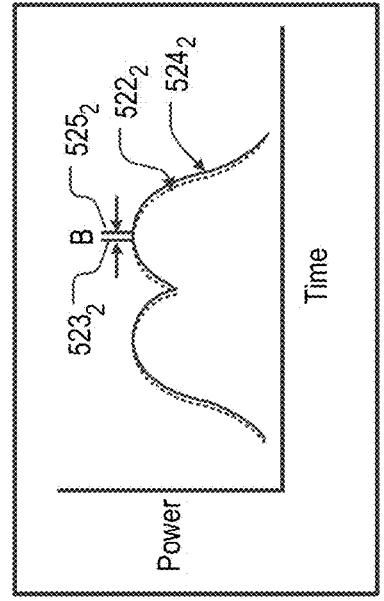
Figure 6A:
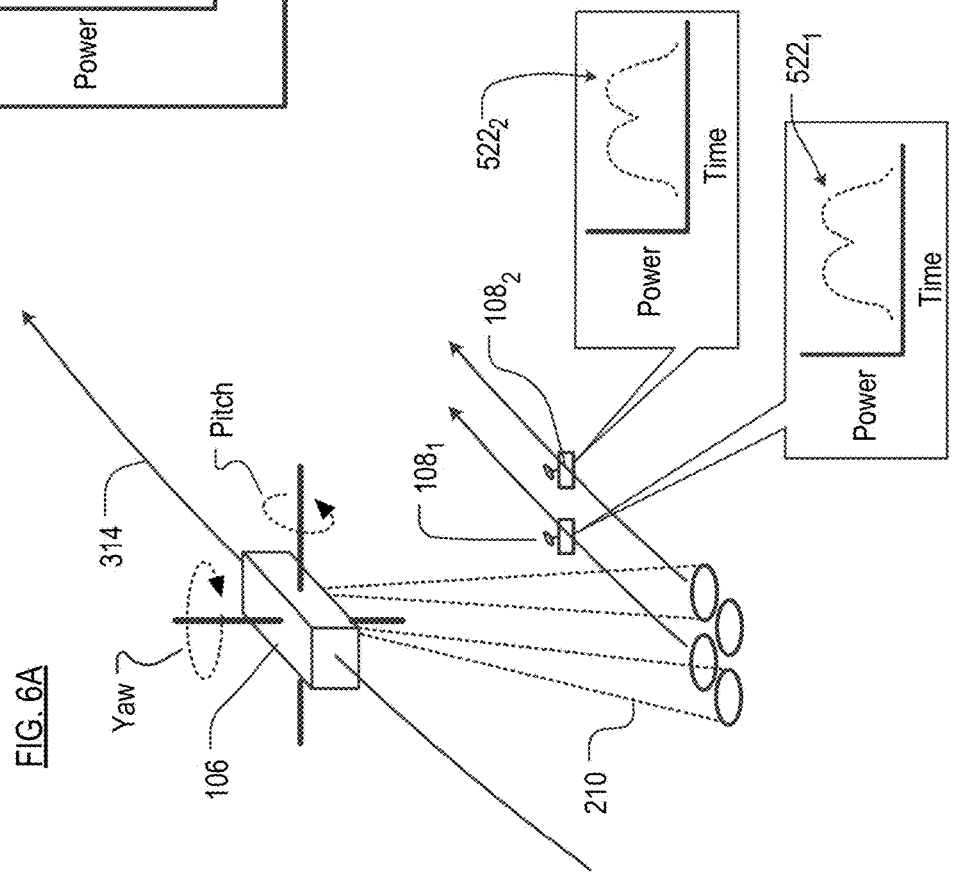

FIGS. 6A through 6C depict a method for measuring pitch and yaw together. This technique requires two or more user terminals. The same principle of "peak" arrival time is used. Thus, two user terminals 108₁ and 108₂ in the path of satellite 106 receive (e.g., from satellite system core network 102 of FIG. 1, etc.) respective profiles 522₁ and 522₂ of expected received power as a function of time. The user terminals measure received power. The received power values are curve fitted and compared to respective profiles 522, as depicted in FIGS. 6B and 6C. FIG. 6B depicts difference A in arrival time between peak power 523₁ (predicted) and peak power 525₁ (measured) for user terminal 108₁. FIG. 6C depicts difference B in arrival time between peak power 523₁ (predicted) and peak power 525₁ (measured) for user terminal 108₂.

Figure 7A:
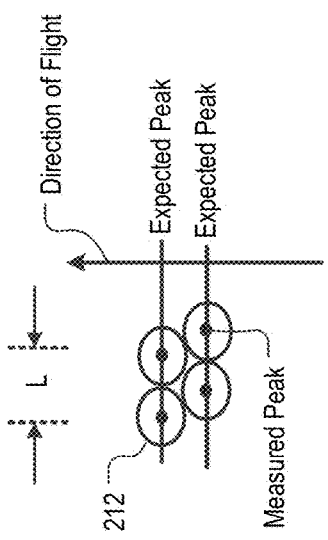
FIGS. 7A-7D depict further detail of methods depicted in FIGS. 5A-5B and 6A-6C for determining yaw and pitch errors.
Figure 7B:
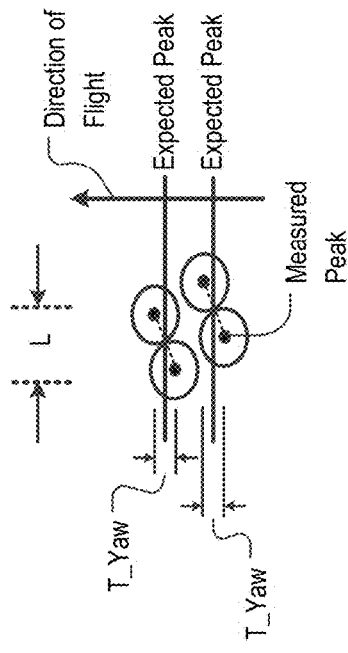
Figure 7C:
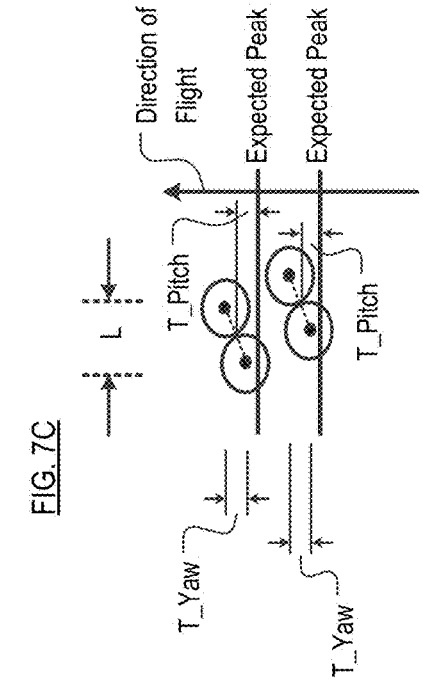

FIGS. 7A through 7D provide further detail about the determination of pitch and yaw errors. FIG. 7A depicts the footprint of four beams and illustrates a scenario in which the time at which peak received power is measured at the user terminal coincides with the predicted timed for peak received power. In other words, there is no attitude (or other) errors. FIG. 7B depicts a yaw error. The arrival time error is designated as T_yaw in FIG. 7B. FIG. 7C depicts both yaw and pitch errors. The arrival time error for pitch is designed as T_pitch. As can be seen from FIG. 7C, the average of the arrival time errors for the two user terminals is indicative of pitch and the difference in the arrival time errors for the two user terminals is indicative of yaw.

Figure 7D:
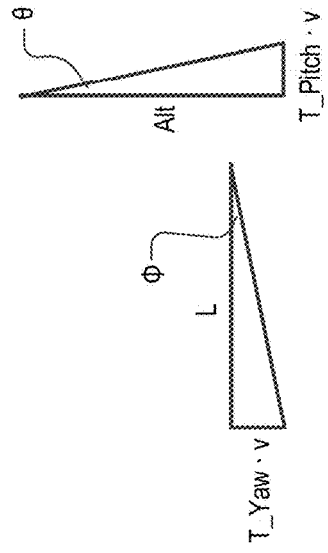

Referring now to FIG. 7D, to determine pitch angle θ and yaw angle φ from the error quantities in time for pitch, (t_pitch), and for yaw, (t_yaw), the 3D coordinates of the satellite and user terminal(s) must be known for all time. With GPS on the satellite, the altitude (alt) and the velocity (v) of the satellite are known. The spacing "L" between user terminals is known from their GPS receivers. For small pitch and yaw angles, trigonometry is used to determine pitch and yaw, as follows and as illustrated in FIG. 7D:

$$\text{Pitch angle} \theta = t\_pitch * v / alt \quad [1]$$

$$\text{Yaw angle} \phi = t\_yaw * v / L \quad [2]$$

FIGS. 8A through 8C depict a method for measuring roll angle β. This technique requires a small group of user terminals $108_i$, i=1, n, such as where n is equal to 6, as a practical minimum. The user terminals are arranged in a line that is essentially perpendicular to the direction of flight of satellite 106. At one moment in time, all user terminals report a power measurement. As depicted in FIG. 7B, the power measurements can be plotted. If these points are connected, they define a curve with the characteristic hump shape. The peak of the curve can then be estimated. This plot is compared a plot of the predicted power for each user terminal at the time of measurement. The shift (left <-> right) of the actual vs. predicted power numbers correlates to the roll angle. For small roll angles, trigonometry is used to determine roll as follows and as illustrated in FIG. 8C:

$$\text{Roll angle } \beta = distance / alt \quad [3]$$

For small angular errors, the methods depicted in FIGS. 5A-5B, 6A-6C, 7A-7D, and 8A-8C are valid even if roll, pitch, and yaw errors are occurring simultaneously.

FIGS. 9A and 9B depict an alternative method for determining roll, pitch, and yaw simultaneously. As depicted in FIG. 9A, a plurality of user terminals $108_i$, i=1, n, is arranged in a line across the path of satellite 106. The user terminals can, alternatively, be randomly positioned as long as there are a sufficient number of user terminals to observe every beam 210 from satellite 106. As depicted in FIG. 9B, each user terminal 108i measures received power for a period of time.

Referring again to FIG. 4, a computer model of the beam patterns can predict what power is received at any particular user terminals at all points in time. Consequently, a total power error can be computed as the sum, over all times and over all user terminals, of the square of the difference between measured power and predicted power, per expression [4]:

$$\text{PowerError} = \Sigma_{\text{all terminals and all times}} (\text{power}_{meas} - \text{power}_{predicted})^2 \quad [4]$$

The computer model can be manipulated to include any and all values of roll, pitch, and yaw error in its prediction. A "brute force" approach to solving the problem is to calculate the total power error for every combination of roll, pitch, and yaw error, with a granularity, for example, of 0.1 deg and then select the case with the lowest total power error. In the absence of measurement noise, this method will have an error of about +/−0.05 deg.

To mitigate the effects of measurement noise, any number of estimation methods known to one skilled in the art can be employed. One method is to "smooth out" the total power error data by computing the average of all neighboring cases for each case and then selecting the lowest power error from the resulting operation, as per expression [5].

$$smoothedPowerError_{j,k} = \left(\frac{1}{2T}\right) \sum_{i-1}^{i+1} \sum_{j-1}^{j+1} \sum_{k-1}^{k+1} PowerError_{j,k} \quad [5]$$

Where i, j, k are indices for the particular instance of roll, pitch, and yaw, respectively.

Any measurements obtained are subject to measurement error and each estimate of the timing discrepancy (e.g., due to improper satellite attitude, etc.) will be corrupted by such measurement error. The error is a random variable and, of course, its value is not known. But the variance of the error can be estimated from knowledge of receiver noise and an analysis of the method used to derive the discrepancy estimate from the received signal. Different discrepancy estimates will not be, in general, statistically independent. There are many reasons, in fact, why certain discrepancy estimates might be correlated. The methods used to calculate the variances of discrepancy estimates can also be used to estimate the mutual correlations between estimates. Estimates of variances and correlations, collectively, are referred to as the "covariance matrix."

Figure 10:
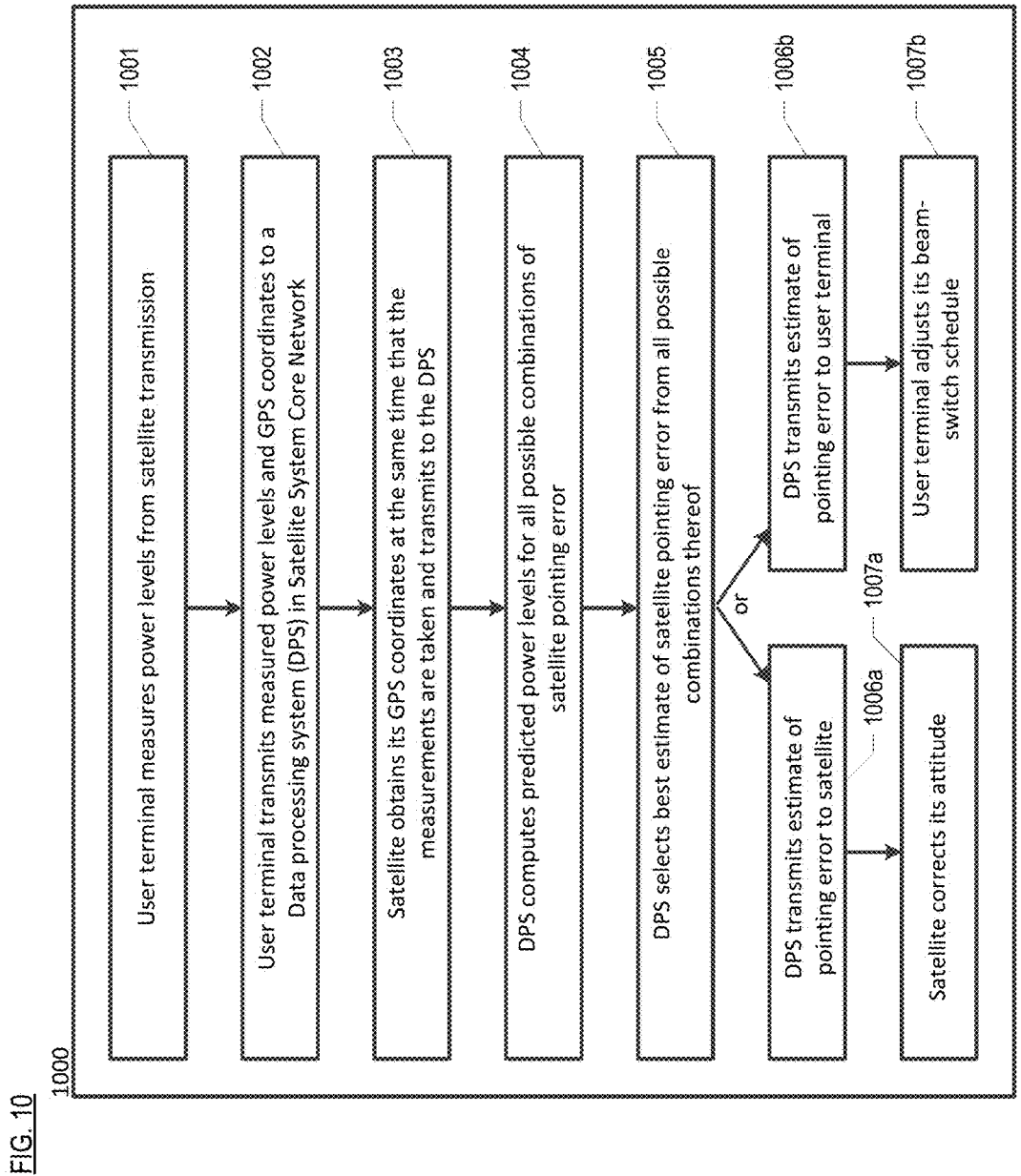
FIG. 10 depicts a first embodiment of a method in accordance with the illustrative embodiment of the present invention.

FIG. 10 depicts method 1000 for maintaining the signal-to-noise ratio (SNR) at the user terminals when switching between beams. Method 1000 uses the techniques discussed above for determining pointing errors (i.e., roll, pitch, and yaw).

In accordance with task 1001, a user terminal measures received power from the satellite beam. Per task 1002, the user terminal transmits the measurement results along with its location (e.g., GPS coordinates, etc.) to a data processing system that is typically, but not necessarily, part of the satellite system core network (see, e.g., FIG. 1). The referenced information is transmitted from the user terminal to the satellite, from the satellite to the gateway antenna, and from the gateway antenna to the data processing system. In addition to transmitting, to the gateway antenna, information received from the user terminal, the satellite also obtains, per task 1003, and transmits its own location data (e.g., GPS coordinates, etc.) to the data processing system. The GPS coordinates for the satellite are obtained for the period of time during which the user terminal is measuring received power.

As per task 1004, the data processing system takes the received power measurements and all of the GPS data, and computes beam-pointing estimates of the satellite or satellites. In accordance with task 1005, the data processing system determines the best estimate of satellite pointing error.

At this point in the method, the processing can proceed in either one of two ways. In accordance with task 1006a, the pointing information is transmitted, via the gateway antenna, to the satellites. Finally, in task 1007a, the satellite corrects its attitude based on the forwarded information.

Alternatively, processing can continue with task 1006b, pointing information is transmitted to the user terminal, which adjusts its beam-switch schedule.

The user terminals at which power levels are measured can be those of actual customers (for the service provided by the system) or they can be terminals belonging to the operator of the system. In some alternative embodiments, rather than using user terminals, specialized receiver equipment created for the purpose of measuring and recording power levels.

There are other possible causes of timing discrepancy in addition to deviations in a satellite's attitude. For example, individual beams can be mechanically misaligned, variations in beam shape, variations in beam strength, a satellite might not be exactly at the prescribed position in its orbit, and so forth. Each such cause will be characterized by some parameter (e.g., satellite orbital position, beam orientation angles, etc.). For each one of these parameters, equivalent steps can be performed as for yaw, pitch, and roll to derive a mathematical relationship between all the parameters (including yaw, pitch, and roll) and the value of the timing discrepancy for a particular measurement. A linear approximation of that relationship is then generated, which yields one linear equation in all the unknown parameters. Additional measurements are obtained until there are at least as many linear equations as unknowns. That system of equations is then solved to find solutions for all the unknown parameters. If there are more equations than unknowns, a least-squares method can be used to find an "optimal" solution. This more complex analysis is now described in further detail.

Figure 11B:
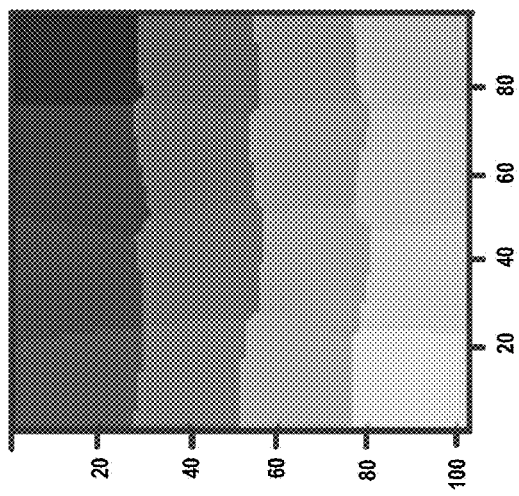
Figure 11A:
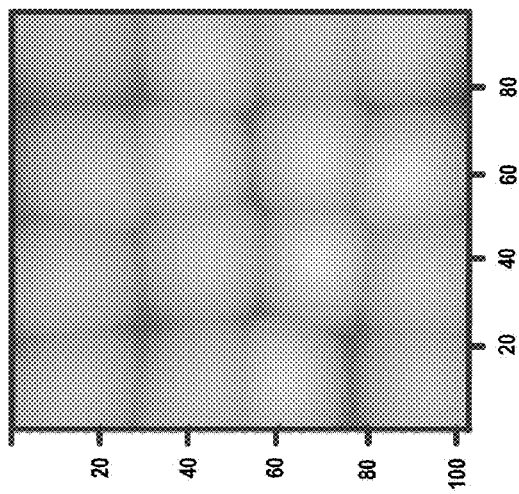
FIG. 11a depicts a simulated map of additional beam errors, including individual beam pointing offsets, variations in beam shape, and variations in beam strength.

FIG. 11a depicts a simulation of all of these effects, with exaggerated variation. FIG. 11b depicts a map of beam-assignment regions on the ground, from the same parameters used to generate FIG. 11a. The boundaries between beams are places where the powers received from neighboring beams are equal and, thus, are places where beam switching should occur.

If a beam assignment map can be recomputed based on measured user terminal data, then the beam switching schedules can be appropriately modified to improve SNR. One technique for computing this map is disclosed below.

Consider data from a set of user terminals that measure and store power data while under a single beam. Each data point has a power z, a user terminal location, and collection time t. Assuming that the errors are constant over the time-measurement interval (e.g., a minute, etc.) and using GPS coordinates from the satellite and user terminals, all of the data can be converted into a single point in time, but collected at different points in space. The analogy is that of an office scanner, where a one-dimensional array of pixels, each with a time history of intensities, can produce a two-dimensional image of the scanned object. Thus, each data point is now an equivalent [x,y,z] point in space, where x and y are latitude and longitude coordinates that are no longer associated with any user terminal location. Assume that the beam power is closely approximated by the equation for a generalized paraboloid:

$$z = a1*x^2 + a2*x + a3*y^2 + a4*y + a5*x*y + a6 \quad [6]$$

With enough [x,y,z] points (i.e., a minimum of 6), a set of equations, all based on expression-n [6], are available to solve by least squares for the unknowns a1, a2, a3, a4, a5, a6:

$$\text{state} = \text{pseudoinverse}(H)*z \quad [7]$$

where: 'state' is the solution for [a1 a2 a3 a4 a5 a6];
H is an array containing all of the $x^2$, x, $y^2$, y, and x*y data from the set of equations based on expression [6]; and
z is the power data associated with the x, y data.

This analysis is performed for all of the satellite beams, one at a time. When analytical functions have been reconstructed for all beams, the beam assignment map can be computed. The beam assignment map was computed by taking all beam powers from the satellite and for each location on the ground, and then selecting the beam with the highest received power.

Figure 12:
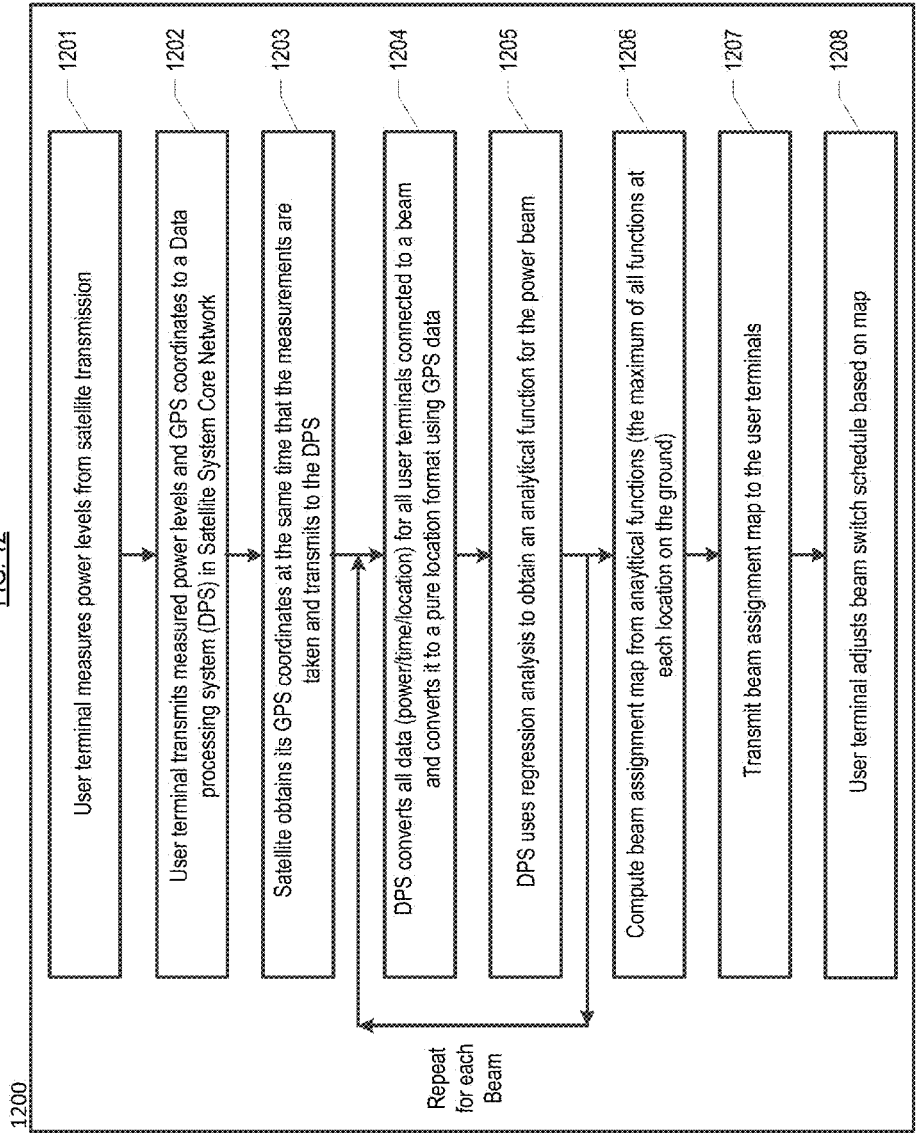
FIG. 12 depicts a second embodiment of a method in accordance with the illustrative embodiment of the present invention.

FIG. 12 depicts method 1200 for maintaining the signal-to-noise ratio (SNR) at the user terminals when switching between beams. Method 1200 uses the techniques discussed above in conjunction with FIGS. 11A and 11B.

The first three tasks (1201 through 1203) of method 1200 are the same as for method 1000 depicted in FIG. 10.

In task 1204, the data processing system, which is typically, but not necessarily, part of the satellite system core network (see, e.g., FIG. 1), converts the data (power/time/location) received from the user terminals and converts it to a pure location format using GPS data (i.e., see discussion above accompanying expression [6]). In task 1205, the data processing system uses a regression analysis, such as least squares, to obtain an analytical function for each beam (i.e., see discussion above accompanying expression [7]). An analytical function is obtained for each satellite beam.

In accordance with task 1206, a beam assignment map is generated from the analytical functions, wherein the map is simply the maximum of all functions at each location on the ground. Per task 1207, the beam assignment map is transmitted to all user terminals. Finally, each user terminal adjusts its beam switch schedule based on the map.

Method 1200 is directed to adjusting the beam switch schedules to compensate for beam pointing errors. Those skilled in the art will appreciate that the techniques disclosed herein can be adapted to enable the satellite to correct its attitude errors by finding the location of the peak of the analytical functions for each beam. The average over all beams' peak locations on the ground can be used to compute roll, pitch, and yaw errors which can be fed to the satellite.

It is to be understood that the disclosure describes a few embodiments and that many variations of the invention can easily be devised by those skilled in the art after reading this disclosure and that the scope of the present invention is to be determined by the following claims.

What is claimed is:

1. A method for maintaining a signal-to-noise ratio at a user terminal when the user terminal switches communications between a first beam and a second beam, wherein the first and second beam are transmitted from a non-geostationary satellite, the method comprising:
    defining a mathematical relationship between at least one of pitch, roll, and yaw offsets of the satellite and a timing discrepancy that arises therefrom, wherein the timing discrepancy is a difference between a reference time for switching communications between the first and second beams and a time for switching communications between the first and second beams such that the signal-to-noise ratio remains constant; and
    adjusting a time at which the user terminal switches communications between the first and second beam based on the mathematical relationship.

2. The method of claim 1 and further comprising determining at least one of the pitch, roll, and yaw offsets by measuring, at the user terminal, power received at least one of the first beam and the second beam, as a function of time.

3. The method of claim 2 wherein determining at least one of the pitch, roll, and yaw offsets further comprises generating a curve fit of the measurements of power received as a function of time obtained by the user terminal.

4. The method of claim 3 wherein determining at least one of the pitch, roll, and yaw offsets further comprises:

comparing the curve fit to a reference profile of expect power received at the user terminal as a function of time; and determining an offset between a peak value of the curve fit and a peak value of the reference profile.

5. The method of claim 2 and further wherein, for measuring pitch and yaw offsets together, at least two user terminals measure power received as a function of time.

6. The method of claim 2 and further wherein, for measuring roll offset, at least six user terminals measure power received as a function of time.

7. The method of claim 1 wherein pitch, roll, and yaw offsets are determined simultaneously, the method further comprising:
   measuring, at a plurality of user terminals, power received from all beams transmitted from the satellite as a function of time, including the first and second beam;
   generating a prediction of power received at the user terminals as a function of time;
   computing a total power error as the sum, over all user terminals, of the square of the difference between measured power received and predicted power received.

8. A method for maintaining a signal-to-noise ratio at a user terminal when the user terminal switches communications between a first beam and a second beam, wherein the first and second beam are transmitted from a non-geostationary satellite, the method comprising:
   determining a pointing error of the first beam and of the second beam by defining a mathematical relationship between at least one of pitch, roll, and yaw offsets of the satellite and a timing discrepancy that arises therefrom, wherein the timing discrepancy is a difference between a reference time for switching communications between the first and second beams and a time for switching communications between the first and second beams such that the signal-to-noise ratio remains constant; and
   transmitting information pertaining to the pointing error of the first beam and the second beam to the satellite;
   adjusting an attitude of the satellite to correct the pointing error of the first beam and the second beam.

9. The method of claim 8 and further comprising determining at least one of the pitch, roll, and yaw offsets by measuring, at the user terminal, power received at least one of the first beam and the second beam, as a function of time.

10. The method of claim 9 wherein determining at least one of the pitch, roll, and yaw offsets further comprises generating a curve fit of the measurements of power received as a function of time obtained by the user terminal.

11. The method of claim 10 wherein determining at least one of the pitch, roll, and yaw offsets further comprises:
   comparing the curve fit to a reference profile of expect power received at the user terminal as a function of time; and
   determining an offset between a peak value of the curve fit and a peak value of the reference profile.

12. The method of claim 9 and further wherein, for measuring pitch and yaw offsets together, at least two user terminals measure power received as a function of time.

13. The method of claim 9 and further wherein, for measuring roll offset, at least six user terminals measure power received as a function of time.

14. The method of claim 8 wherein pitch, roll, and yaw offsets are determined simultaneously, the method further comprising:
   measuring, at a plurality of user terminals, power received from all beams transmitted from the satellite as a function of time, including the first and second beam;
   generating a prediction of power received at the user terminals as a function of time;
   computing a total power error as the sum, over all user terminals, of the square of the difference between measured power received and predicted power received.

15. A method for maintaining a signal-to-noise ratio at a user terminal when the user terminal switches communications between a first beam and a second beam, wherein the first and second beam are transmitted from a non-geostationary satellite, the method comprising:
   measuring, at the user terminal, power received from at least the first beam;
   transmitting, from the user terminal, the measurements of power received and a location of the user terminal, to a data processing system;
   transmitting, from the satellite to the data processing system, one or more locations of the satellite obtained while the measurements of power were measured by the user terminal;
   generating, at the data processing system, predicted received power levels at the user terminal for all possible combinations of pointing error of the satellite;
   selecting, at the data processing system, a best estimate of satellite pointing error from all possible combinations thereof; and
   transmitting, from the data processing system, the best estimate of satellite pointing error to one of: (a) the satellite and (b) the user terminal, wherein:
   (i) if the best estimate is transmitted to the satellite, the method further comprises: correcting, at the satellite, the pointing error thereof based on the best estimate thereof;
   (ii) if the best estimate is transmitted to the user terminal, the method further comprises adjusting, at the user terminal, a beam-switching schedule.

* * * * *